United States Patent [19]

de Fries

[11] 4,066,101
[45] Jan. 3, 1978

[54] MULTIPLE WAY VALVE

[76] Inventor: Jan Richard de Fries, Hirschwiesenstr. 9, Zurich, Switzerland

[21] Appl. No.: 591,392

[22] Filed: June 30, 1975

[30] Foreign Application Priority Data

June 28, 1974 Germany ............................. 2431135

[51] Int. Cl.² .......................................... F15B 13/042
[52] U.S. Cl. .................................. 137/625.6; 251/61.2
[58] Field of Search ......................... 137/625.6, 625.64; 251/61.2

[56] References Cited

U.S. PATENT DOCUMENTS

| 3,181,566 | 5/1965 | Volkmann | 137/625.6 |
| 3,212,446 | 10/1965 | Golden et al. | 92/98 R X |
| 3,228,422 | 1/1966 | Bade | 137/625.6 |
| 3,353,453 | 11/1967 | Ramspeck | 91/461 X |
| 3,552,270 | 1/1971 | Lange | 91/461 X |
| 3,638,534 | 2/1972 | Ramspeck | 91/461 X |
| 3,653,299 | 4/1972 | Howard | 91/461 X |
| 3,768,515 | 10/1973 | Trusselle | 137/625.6 |
| 3,902,526 | 9/1975 | Brake et al. | 137/625.64 |
| 3,913,620 | 10/1975 | Pauliukonis | 137/625.64 |
| 3,916,952 | 11/1975 | Pauliukonis | 137/625.64 |

FOREIGN PATENT DOCUMENTS

| 2,227,778 | 12/1973 | Germany | 137/625.6 |
| 1,908,150 | 9/1970 | Germany | 91/461 |

Primary Examiner—Alan Cohan
Assistant Examiner—Gerald A. Michalsky
Attorney, Agent, or Firm—Watson, Cole, Grindle & Watson

[57] ABSTRACT

A multiple way valve has a main valve chamber and a control valve chamber. Within the main valve chamber is an axially movable valve body. The control valve chamber includes a mechanically operable control valve body. A pressure line opens from a pressure medium source into the main valve chamber and also a working line which is closed with respect to the pressure line in extreme position of the main valve body and connected to it in the other extreme position. A partition separates the control valve chamber from the main valve chamber, the partition being movable in an axial direction. One end face of the main valve body facing away from the partition is connected to the pressure line in all positions of the main valve body and the second end of the main valve body is firmly attached to the partition. There is a connecting line which is open at all times with respect to the first end face of the main valve body and opens into the control valve chamber. A control exhaust line is connected to the control valve chamber and the control valve body closes the control exhaust line in its first extreme position with the connecting line open and closes the connecting line in its second extreme position with the control exhaust line open. The surface of the movable partition which is exposed to the pressure medium from the control valve chamber is greater than the surface of the main valve body which can be acted on in the reverse direction. Thus, when the control valve body is moved from its first extreme position to its second extreme position, the main valve body shifts over in a snap-action manner.

9 Claims, 1 Drawing Figure

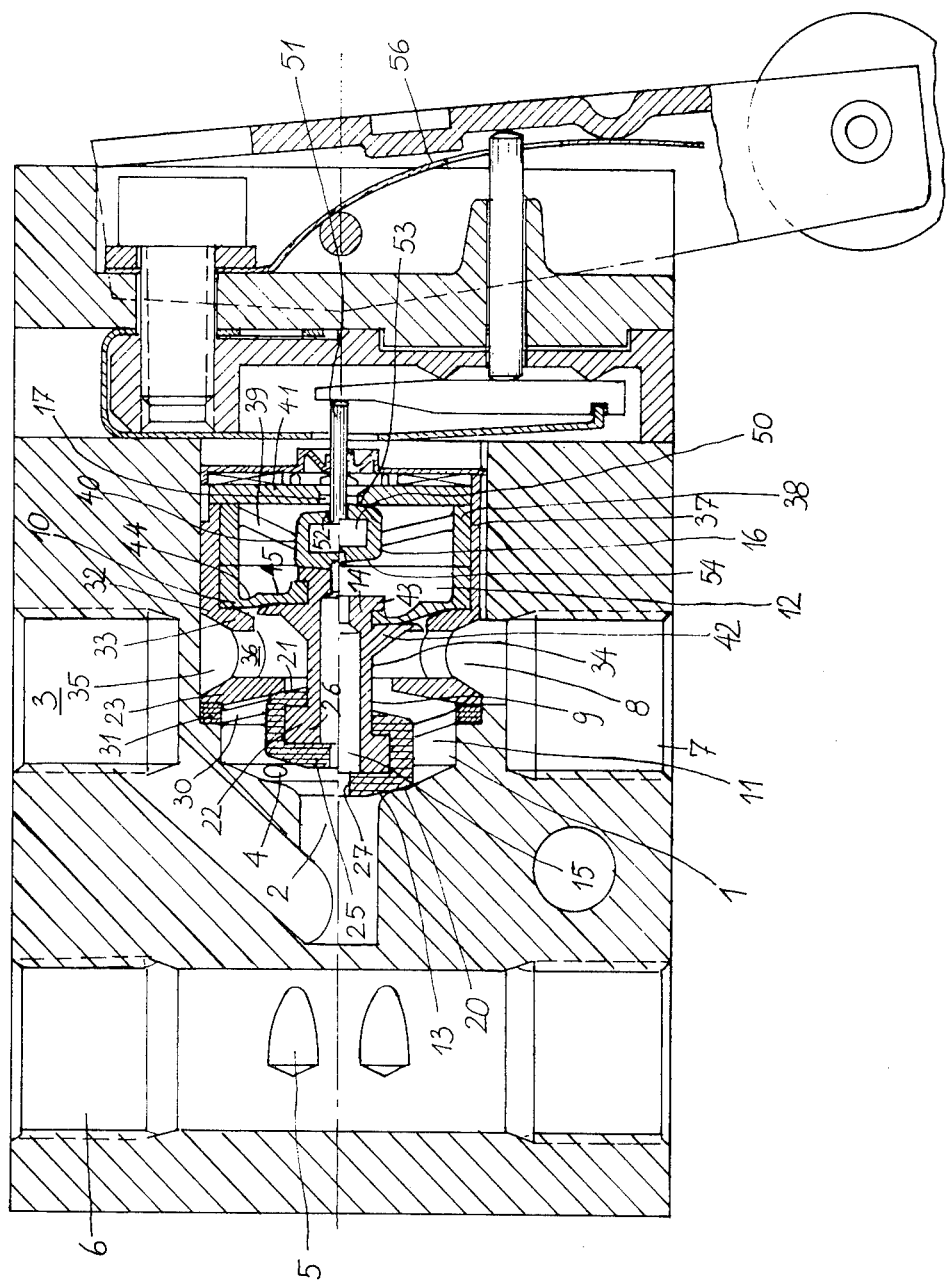

MULTIPLE WAY VALVE

The present invention relates to a multiple way valve with a main valve chamber containing a main valve body controlled by pressure medium and located in such a way that that it can be moved axially and with a control valve chamber containing a mechanically operable control valve body, there being at least one pressure line opening from a pressure medium source into the main valve chamber and also one working line which is closed off from the pressure line in the first extreme position of the main valve body and connected to the pressure line in the second extreme position of the main valve body. The present invention thus concerns a multiple way valve in which the main valve is controlled by means of a control valve which is mechanically operable.

SUMMARY OF THE INVENTION

The object of the present invention is to produce a multiple way valve which operates extremely reliably while being simpler in its construction and cheaper to manufacture than known multiple way valves.

According to the present invention, this object is solved in that the control valve chamber arranged adjacently to the main valve chamber in an axial direction is separated from the main valve chamber by a partition which can be moved in an axial direction, the first axial end face of the main valve body facing away from the movable partition being connected to the pressure line in each position of the main valve body and the second axial main valve body end region containing the second end face opposite to the first end face being firmly attached to the movable partition, and in that a connecting line, which is at all times open with respect to the first end face of the main valve body, is open to the control valve chamber, the control valve chamber also being connected to a control exhaust line and the control valve body closing the control exhaust line in its first extreme position with the connecting line open and closing the connecting line in its second extreme position with the control exhaust line open, the surface of the movable partition which can be acted on by the pressure medium from the control valve chamber being sufficiently larger than the surface of the main valve body which can be acted on in the reverse direction that when the control valve body is transferred from its first extreme position into its second extreme position the main valve body shifts over in a snap-action manner from its first extreme position into its second extreme position and vice versa. Thus, for example, if the control valve body is in its first position which closes the control exhaust line, the control valve chamber is connected to the pressure line through the connecting line in such a way that although the same pressure is applied in opposite directions to the two end faces of the main valve body, the force exerted on the main valve body from the control valve chamber exceeds that exerted in the opposite direction on the main valve body with the result that the main valve body remains in its first extreme position. If the control valve body is now operated mechanically and moves towards its second position which closes the connecting line, the control exhaust line is opened and the free cross-section of the control exhaust line assumes such a proportion even after a relatively short actuating travel that the static pressure in the control valve chamber can no longer restrain the main valve body in its first extreme position and thus the main valve body snaps over towards its second extreme position even before the control valve body has completely moved over to its second extreme position. Thus, in addition to the simple construction and operating reliability, there is also the advantage of an extremely short response time.

BRIEF DESCRIPTION OF THE DRAWINGS

The present invention will now be described with reference to the drawing, further advantageous features, such as concerning the design of the diaphragm, being given in the description of the drawing. The drawing shows the longitudinal section of a multiple way valve according to the invention.

DESCRIPTION OF THE PREFERRED EMBODIMENTS

In the housing of FIG. 1, there is an axial cylindrical recess 1 in which a pressure line 2 enters which can be connected to a pressure source through a first port 3. In addition, a working line 4 also enters the axial recess 1, and this working line is connected by a line (not shown) to a second connection 6, leading for example to a working cylinder, through channels contained within the housing 1 and whose outlets can be seen at 5. Finally, a main exhaust line 8 is also provided between a third port 7 and the axial recess 1.

By means of the multiple way valve shown, the working line 4 can either be connected to pressure line 2 or to the main exhaust line 8. In the lower half of the figure, the position of the valve is shown in which the line 4 is connected with the main exhaust line 8 while communication between pressure line 2 and working line 4 is shut off, whereas the upper half of the figure shows the position of the valve in which pressure line 2 is connected with working line 4, working line 4 being sealed off at the same time from main exhaust line 8. The axial cylindrical recess 1 is divided into a main valve chamber 11 and a control valve chamber 12 by a diaphragm 10 which is firmly held by its outer periphery, and thus the diaphragm 10 represents a partition which can be moved axially. The main valve chamber 11 contains a main valve body 9 whose first axial end face 13 is always connected to the pressure line 2. The second axial end region 14 of the main valve body 9 opposite to the first end face 13 is firmly attached to the diaphragm 10. The main valve body 9 is thus suspended by means of diaphragm 10 and can be moved to and fro between two extreme positions, the first extreme position being shown in the lower half and the second extreme position being shown in the upper half of the figure. The control valve chamber 12 is connected to the first end face 13 of the main valve body 9 by means of a connecting line 15 which passes through the main valve body 9 in an axial direction as a through-hole. The opening of the connecting line 15 into the control valve chamber 12 is associated with a control valve body 16 which in its first extreme position, shown in the lower half of the figure, uncovers the opening of connection line 15, whereas in its second extreme position, shown in the upper half of the figure, it closes connection line 15. In addition to connecting line 15, an auxiliary exhaust line 17 also opens into the auxiliary valve chamber 12 and this auxiliary exhaust line 17 is closed by the auxiliary valve body 16 in its first extreme position and opened when the control valve body 16 is in its second extreme position. As can also be seen from the figure, the surface of the diaphragm 10 made of an elastic material which can be acted on by pressure medium from the control valve chamber 12 is larger than the surface of the main valve body 9 which can be acted on in the opposite direction and thus the main valve body 9 is held in its first extreme position by the pressure which exists in the auxiliary valve chamber 12 with the auxiliary exhaust line 17 closed, while the pressure acting on its first end face 13 holds it in its second extreme position in which the control exhaust chamber 12 is exhausted. The main valve body 9 has two sealing surfaces, namely a first sealing surface which is formed by the first end face 13 and which is associated with the annular surface 20 designed as valve seat and containing the port of working line 4, this annular surface 20 being limited on the one hand by the port of pressure line 2 and on the other hand by the cylindrical surface of the axial recess 1, and a second sealing surface 21 on a flange 22 of the main valve body 9 opposite to the first end face 13 and associated with an annular shoulder 23, this sealing surface projecting forward towards the inside in a radial direction from the cylindrical surface of the axial recess 1. The axial extension of the flange 22 is smaller than the distance of the annular shoulder 23 from the annular surface 20 and the diameter of flange 22 is larger than the internal diameter of the shoulder 23. The transfer from pressure line 2 to working line 4 is thus controlled from the first sealing surface 13 and the transfer from working line 4 to main exhaust line 8 is controlled by the second sealing surface 21. The annular surface 20 and the first sealing surface 13 each have the shape of a cone extending towards the auxiliary valve chamber 12, where the annular surface 20 and the first end face 13 may be inclined by about 15° with respect to the radial direction and flange 22 has a jacket 25 made of elastic material such as polyurethane enclosing an internal plunger 26 the effective surface of which faces towards pressure line 2 at right angles to the longitudinal axis of the main valve body. With its annular surface 27 which can be acted on in a radial direction, the jacket 25 also constitutes the start of connection line 15. The second sealing surface 21 of main valve body 9 as well as shoulder 23 associated with it also have a conical shape and are inclined in opposite directions like annular surface 20 and the first sealing surface 13 of the main valve body 9. The purpose of the conical construction of the sealing surfaces will be discussed at a later point in the description of the principle of operation of the multiple way valve. Centering arms 30 are connected in one piece with the jacket 25 of flange 22, and the ends of the centering arms facing way from the jacket 25 are also connected together in one piece by a first gripping ring 31. The centering arms 30 are distributed uniformly over the periphery and the first gripping ring 31 is firmly secured in place against the cylindrical surface of axial recess 1, the first gripping ring 31 bearing on shoulder 23 which is a component part of a sleeve-type insert 32. The periphery of the sleeve-type insert 32 is in contact with the surface of the axial cylindrical recess 1 and in addition to shoulder 23 it also has a ring 33 projecting radially inwards, the shell section of insert 32 connecting the annular shoulder 23 with ring 33 being inwardly curved over the entire periphery towards the reduced section 34 of the main valve body resulting in an annular gap 35 between the dented shell section and the surface of the axial recess, this annular gap 35 being connected with the main exhaust line 8 and connected with the main valve chamber 11 by exhaust holes 36 in the grooved shell section 35. In addition, the insert 32 has a cylindrical prolongation 37 on the internal periphery of which the external periphery of diaphragm 10 is in contact which is secured in an axial direction against ring 33 of insert 32 on the one hand and against a second gripping ring 38 on the other hand which is attached in one piece by means of centering arms 39 with an elastic casing 40 of the auxiliary valve body 16. The material for the unit formed by the casing 40 of the control valve body, the centering arms 39 and the second gripping ring 38 is also intended to be polyurethane as it is for the unit formed by the jacket 25 of the main valve body, the centering arms 30 and the first gripping ring 31. Both the second gripping ring 38 and the cylindrical prolongation 37 of the insert 32 are limited in axial direction by a cover the 41 which contains the control exhaust line 17 and also forms an end of the control valve chamber 12. The diaphragm 10 is attached to the main valve body 9 by fastening between two radial projections 42 and 43 on the main valve body. In addition to its first reinforced annular zone attached to the first main valve body and its third reinforced annular zone secured in place between ring 33 and the second gripping ring 38, the diaphragm 10 itself also has a second reinforced annular zone which, viewed in a radial direction, is located between the first and the third annular zones, the first and the second reinforced annular zones being connected together by means of a first articulated thin annular zone 45 and the second and the third reinforced annular zones being connected together by means of a second articulated thin annular zone 44. Apart from having good centering characteristics, diaphragm 10 thus displays a very high degree of flexibility. As can also be seen from the drawing, all the reinforced annular zones project inwards towards the auxiliary valve chamber. With regard to the diaphragm made of polyurethane, it should still be mentioned that the radial projection 42 on the main valve body facing towards the main valve chamber 11 covers not only the first reinforced annular zone but also the first thinned annular zone 45 towards the main valve chamber, projection 22 being opposite ring 33 of insert 32 and embracing this with little play as a result of which the diaphragm is supported especially well overall.

So far, only the contruction of the multiple way valve has been described. The principle of operation of the multiple way valve will now be described below. If the main valve body 9 as well as the auxiliary body 16 are each in their respective first extreme positions, as shown in the lower half of the figure, the working line 4, which can open into the annular surface 20 on the front end through several branch lines distributed over the periphery, is connected with exhaust line 8 while the port of pressure line 2 is closed with respect to working line 4. The auxiliary valve chamber 12 is under pressure through connecting line 15 since auxiliary exhaust line 17 is closed by control valve body 16. At the same time, annular surface 27 of jacket 25 of the main valve body is subjected to pressure resulting in radial stressing of the jacket 25. Consequently, and as a result of the conical valve seat, especially good valve sealing results which is further improved on by the effective surface of plunger 26 that is at right angles to the longitudinal axis of the valve. Even if no pressure exists in the pressure line 2, the main valve body 9 is in its first extreme position since diaphragm 10 is placed in its position corresponding to the first end position of the main valve body. In addition, the two elastic units containing the centering arms 30 and 39 of the main valve body and control valve body respectively also have two stable extreme positions in each case, corresponding respectively to the first extreme position and the second extreme position of the main valve body, with the result that the main valve body, when in its first extreme position, also continues to be held in its first extreme position by the centering arms 30 and 39 if the pressure is removed. If one now wishes to transfer the main valve body 9 into its second extreme position, which is shown in the upper half of the figure, auxiliary valve body 16 must be operated. To permit operation from the outside, the auxiliary valve body 16 has, apart from its elastic casing 40, a disc-type core 50 which is firmly connected with an operating pin 51 and penetrating with clearance an opening 52 in casing 40 and projecting outwards through the control exhaust line 17. Because the fourth sealing surface 53 on the auxiliary valve body 16 forms a small angle of, for example, 5° with the cover 41 and as a result of the clearance which exists between operating pin 51 and casing 40, wear-resistant conditions are also created on the auxiliary valve body 16 and by exerting an operating force on the operating pin 51 initially only the third sealing surface 54 which is opposite the fourth sealing surface 53 moves towards the connecting line 15 while the fourth sealing surface 53 is still closely joined to the cover and closes the auxiliary exhaust line 17. This is made possible by the elastic construction of casing 40. After a period of time, the first leakages now occur at the port of auxiliary exhaust line 17 resulting in the static pressure in the auxiliary valve chamber being reduced. Consequently, a lower operating force than before need be applied to further move the operating pin 51 since the force opposing the operating force is reduced because of this. If the static pressure in the auxiliary valve chamber 12 reaches a certain value, the main valve body is finally transferred with a snap-action from its first extreme position to its second extreme position as a result of the force exerted on it by the pressure medium in pressure line 2. The pretension which exists in the diaphragm and in the centering arms increases the snap action. Another determining factor for the switchover of the main valve body is the pressure drop in the region of transfer from the working line to the main exhaust line during switching. It can be said that the valve displays the characteristics of a check valve. After passing through the central position which is reached quickly due to the pressure propagation, the main valve body acts as a self-closing flap against the main exhaust line. The switching process takes place extremely quickly, characteristic test values being less than 3 milliseconds. Another reason for the switching process taking place very quickly is that the main valve body moves towards the auxiliary valve body during the switching process as a result of which the necessary stroke of operating pin 51 is shortened. During the switching process, a slight compression occurs in the auxiliary valve chamber 12 due to the movement of diaphragm 10, and this slightly cushions the switching process. Clearly, to achieve an extremely short switching time the volume of auxiliary valve chamber 12 must be kept small in order for pressurization and depressurization to take place at high speed. Furthermore, although theoretically as with all valve systems driven by auxiliary valves which are not free of overlap a continuous air consumption can arise at the auxiliary valve, a continuous air consumption of this kind does not however occur, or is hardly detectable, in practice with the multiple way valve according to the present invention. The switching process is finally concluded by the displacement of the remaining pressure medium from the auxiliary valve chamber, and after this the second sealing surface 21 of jacket 25 of the main valve body bears against shoulder 23 between working line 4 and main exhaust line 8 and the third sealing surface 54 of the control valve body 16 is joined closely to the port of connecting line 15. To move back the main valve body 9 from its second extreme position into its first extreme position, it is simply necessary either to pull back the operating pin 51 or to simply release it, and this is sufficient because the pressure medium acts on auxiliary valve body 16 through connecting line 15 and furthermore the elastic suspension of the auxiliary valve body exerts an elastic return force. Since, as mentioned above, all stationary parts are secured in place in an axial direction against each other, these cannot move during the various switching processes and thus they are not subjected to wear. It should also be mentioned that, if the main valve body is in its first extreme position, even a sudden pressure rise in pressure line 2 does not lift the first end face 13 from its valve seat even though the pressure wave first encounters the first end face 13 before reaching control valve chamber 12. A pressure wave reaching the first end face does not in fact only act in the axial direction on the main valve body, but also exerts a radial force on the annular surface 27 of jacket 25 thereby pressing jacket 25 firmly against the valve seat. To increase reliability with respect to a possibly occurring short lifting of the first end face 13 from its valve seat if a sudden pressure wave occurs, one can also arrange a capacitor or a low-pass filter in pressure line 2 which causes an impact wave to precede the pressure wave, the impact wave having sufficient dimensions to produce an adequate closing force both from the control valve chamber 12 and also via the annular surface 27. The last advantageous measure to be mentioned is that the operation of operating pin 51 can be effected through an elastic element, e.g. a leaf spring 56 and a suitable force transmission arrangement, resulting in an even more marked snap-action switching behaviour.

The above discourse has shown that the multiple way valve according to the present invention is very simple in its construction and thus cheap to manufacture and at the same time meets all requirements for a valve of this type in an optimum way. The invention concerns not only three-way valves as shown in the drawing because, if one imagines the example illustrated and discussed to be without the main exhaust line, the two-way valve which then results is also fully capable of operation.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A multiple way valve comprising means forming a main valve chamber containing an axially movable main valve body (9) controlled by pressure medium and having first and second axial end faces and having first and second end regions, a control valve chamber (12) having a cover and containing a mechanically operable control valve body, there being at least one pressure line opening from a pressure medium source into the main valve chamber and one working line which is closed with respect to the pressure line in the first extreme position of the main valve body and connected to the pressure line in the second extreme position of the main valve body, a partition separating the said control valve chamber (12) having a cover, which valve chamber is arranged adjacently to the main valve chamber (11) in an axial direction from the main valve chamber (11), said partition being movable in an axial direction, the first axial end face (13) of the main valve body (9) constituting a first sealing surface and facing away from the movable partition being in a space connected to the pressure line (2) in each position of the main valve body and the second axial main valve body end region containing the second end face opposite to the first end face (13) being firmly attached to the movable partition (10), and a connecting line (15), which is at all times open with respect to the first end face (13) of the main valve body (9), opening into the control valve chamber (12), a control exhaust line (17) connected to the control valve chamber (12) the control valve body (16) closing the control exhaust line (17) in its first extreme position with the connecting line (15) open and closing the connecting line (15) in its second position with the control exhaust line (17) open, the surface of the movable partition (10) which can be acted on by the pressure medium from the control valve chamber (12) being larger than the surface of the main valve body (9) which can be acted on in the reverse direction, whereby when the control valve body (16) is transferred from its first extreme position into its second extreme position, the main valve body (9) shifts over in a snap-action manner from its first extreme position into its second extreme position and vice versa, in which the housing of the multiple way valve has an axially cylindrical recess (1) having a frontal boundary surface and the partition is a diaphragm (10) made of elastic material firmly held by its external periphery, and in which the pressure line (2) opens centrally into the axial recess (1) at its frontal boundary surface, the annular surface (20) of the frontal boundary surface, bounded by the pressure line (2) and by the cylindrical surface of axial recess (1), constituting a valve seat for the first end face (13) of main valve body (9), the said main valve body (9) having an axial through-hole constituting said connecting line (15), the internal periphery of the diaphragm (10) being attached to the external periphery of the second axial end region of the main valve body (9), and the control valve body (16) being arranged centrally in the control valve chamber (12) and having a third sealing surface associated with a port of the connecting line (15) and a fourth sealing surface which is associated with the control exhaust line (17) which is arranged centrally in the cover (41) of the control valve chamber (12), said cover (41) being arranged centrally with respect to the diaphragm (10) on the opposite side thereof from the valve seat in an axial direction; said diaphragm comprising, in a radial direction from inside to outside successively, a first reinforced annular zone attached to the main valve body (9), a first articulated thinner annular zone (45), a second reinforced annular zone, a second articulated thinner annular zone (44) and a third reinforced annular zone, said diaphragm (10) being firmly held, the reinforced annular zones each projecting towards the auxiliary valve chamber with respect to the adjacent thinner annular zones, and said main valve body has a radially projecting flange (22) positioned adjacent to the annular surface (20), wherein a jacket (25) is positioned over said radially projecting flange, one side of which forms said first end face (13) of said main valve body (9), and wherein radially extending elastic centering arms (30) are connected between said jacket (25) and a gripping ring (31) positioned against said means forming said main valve chamber.

2. The multiple way valve set forth in claim 1 in which the working line (4) has a port into the main valve chamber (11) arranged in the annular surface (20) and a main exhaust line (8) opens into the main valve chamber (11) between the working line (4) and the diaphragm (10) viewed in an axial direction, an annular shoulder (23) projecting radially inwards from the cylindrical surface of the axial recess (1) at a point between the port of working line (4) and the main valve chamber, said shoulder (23) embracing with clearance a reduced section (34) of the main valve body (9), said flange 22 radially projects from said reduced section (34) in the section adjacent the annular surface (20), said flange (22) containing not only said first sealing surface (13) but also a second sealing surface (21) opposite thereto, the axial dimension of said flange (22) being smaller than the distance of the annular shoulder (23) from the annular surface (20) bounding the main valve chamber (11) and its diameter being larger than the diameter of the annular shoulder (23), said flange (22) sealingly engaging the annular surface (20) in the first extreme position of main valve body (9) and in the second end position of the main valve body sealing against the annular shoulder (23).

3. The multiple way valve set forth in claim 2 in which the frontal annular surface bounding the main valve chamber (11) has the shape of a cone expanding towards the control valve chamber (12) and in which the first sealing surface (13) has a corresponding conical shape, wherein said jacket (25) is made of elastic material and wherein said main valve body (9) has an inner plunger (26) of hard material the effective surface of which facing the pressure line (2) has at right angles to the longitudinal axis of the main valve body (9), and in which the jacket (25) accommodating plunger (26) in the area of the first sealing surface (13) has an annular surface (27) to which pressure can be applied in a radial direction and forming the start of connection line (15).

4. The multiple way valve set forth in claim 3, in which elastic centering arms (39) are attached to the control valve body (16), projecting radially, the centering arms (39) of control valve body (16) being connected in one piece with its casing (40), its ends facing away from casing (40) being connected together in one piece by a gripping ring (38).

5. The multiple way valve set forth in claim 2, having a housing in which a sleeve-type insert (32) formed as a shell section is located in the cylindrical recess (1) of the housing in the axial length of the main exhaust line (8) and resting with its periphery against the cylindrical surface of said recess (1), the insert (32) having the annular shoulder (23) projecting in a radial direction and a ring (33) which is opposite to a projection (42) of the main valve body facing towards the main valve chamber, the shell section of the insert (32) connecting the annular shoulder (23) with ring (33) being grooved over its entire periphery towards the main valve chamber in such a way that an annular gap (35) connected with the main exhaust line (8) is formed between the grooved shell section and the cylindrical surface of the axial recess (1), said annular gap (35) being connected with the main valve chamber (11) by exhaust holes (36) in the grooved shell section.

6. The multiple way valve as set forth in claim 1, in which the control valve body (16) comprises a disc-type core (50) with a casing (40) of elastic material completely enclosing said core, the casing (40) having an opening (52) for an operating pin which is firmly attached to core (50) and projects outwards through the control exhaust line (17).

7. The multiple way valve set forth in claim 1, in which the diaphragm (10) is of polyurethane.

8. The multiple way valve set forth in claim 7, in which the main valve body has a first radial projection (42) facing towards the main valve chamber (11) and a second radial projection (43) facing towards the auxiliary valve chamber, providing a space therebetween in which the inner edge of the diaphragm (10) fits, and in which the first radial projection covers the first reinforced annular zone and the first thinned annular zone (45) towards the main valve chamber, and in which a ring (33) projects radially inwards from the cylindrical surface of the axial recess (1), said ring (33) projects radially inwards from the cylindrical surface of the axial recess (1), said ring (33) being opposite the radial projection (42) of the main valve body facing towards the main valve chamber in the first extreme position of the main valve body (9) and embracing said projection (42) with small clearance.

9. In a valve as claimed in claim 1, the main valve body having an axial bore therein constituting the connecting passage, and the end of the main valve body opposite the control valve being provided with a valve seat around the opening of the axial bore.

* * * * *